(12) United States Patent
Cheung et al.

(10) Patent No.: US 6,952,750 B2
(45) Date of Patent: Oct. 4, 2005

(54) METHOD AND DEVICE FOR PROVIDING A LOW POWER EMBEDDED SYSTEM BUS ARCHITECTURE

(75) Inventors: Hugo Cheung, Tucson, AZ (US); Lu Yuan, Carlsbad, CA (US); Terence Chiu, Tucson, AZ (US)

(73) Assignee: Texas Instruments Incoporated, Dallas, TX (US)

( * ) Notice: Subject to any disclaimer, the term of this patent is extended or adjusted under 35 U.S.C. 154(b) by 599 days.

(21) Appl. No.: 09/965,143

(22) Filed: Sep. 27, 2001

(65) Prior Publication Data

US 2002/0166074 A1 Nov. 7, 2002

Related U.S. Application Data

(60) Provisional application No. 60/289,000, filed on May 4, 2001.

(51) Int. Cl.[7] .............................................. G06F 13/00
(52) U.S. Cl. .......................... 710/305; 710/107; 710/38
(58) Field of Search ...................... 710/27–38, 107–115, 710/305–316, 2–4; 711/137; 714/9

(56) References Cited

U.S. PATENT DOCUMENTS

| | | | | | |
|---|---|---|---|---|---|
| 4,665,483 | A | * | 5/1987 | Ciacci et al. ................ | 710/114 |
| 4,939,643 | A | * | 7/1990 | Long et al. ..................... | 714/9 |
| 5,339,395 | A | * | 8/1994 | Pickett et al. ................ | 710/305 |
| 5,553,249 | A | * | 9/1996 | Datwyler et al. ........... | 710/307 |
| 5,619,728 | A | * | 4/1997 | Jones et al. .................... | 710/27 |
| 5,652,858 | A | * | 7/1997 | Okada et al. ................ | 711/137 |
| 5,724,603 | A | * | 3/1998 | Nishiguchi .................... | 712/33 |
| 5,832,244 | A | * | 11/1998 | Jolley et al. ................. | 710/305 |
| 5,898,857 | A | * | 4/1999 | Beaman et al. ............. | 710/113 |

* cited by examiner

Primary Examiner—Christopher B. Shin
(74) Attorney, Agent, or Firm—W. Daniel Swayze, Jr.; W. James Brady; Frederick J. Telecky, Jr.

(57) ABSTRACT

The tristateless bus interface communication scheme according to the present invention addresses many of the shortcomings of the prior art. In accordance with various aspects of the present invention, a low power embedded system bus architecture is provided with a bus interface connected to one or more peripheral interface using logic processes to enable microcontroller-based products and other components and devices to achieve a low power data transmission between central processors and peripheral devices. In accordance with an exemplary embodiment, a low power embedded system bus architecture comprises logic devices, for example, an OR gate for passing through only data from a selected peripheral device. To facilitate the throughput of data, the non-selected peripheral devices may only provide logic zero to the OR gate. The logic device arrangement may comprise any combination of logic devices which performs the function of eliminating the need for tristate buffers. Through the elimination of tristate buffers, the present invention can lower the power consumed by the microcontroller, and improves the ability to test a large portion of the devices. In accordance with an exemplary embodiment, an AND gate is provided in each peripheral device for providing a logic zero when the peripheral device is not selected, and for providing data when the peripheral device is selected. In addition the AND gate eliminates the occurrence of high impedance Z states.

18 Claims, 5 Drawing Sheets

METHOD AND DEVICE FOR PROVIDING A LOW POWER EMBEDDED SYSTEM BUS ARCHITECTURE

CROSS REFERENCE TO RELATED APPLICATION

This application claims the benefit of, and priority to, provisional application Ser. No. 60/289,000, filed May 4, 2001, which application is hereby incorporated by reference in its entirety.

FIELD OF INVENTION

The present invention relates to an embedded system bus architecture for use in microcontroller-based products. More particularly, the present invention relates to a low power embedded system architecture to facilitate access of peripheral devices from a microcontroller.

BACKGROUND OF THE INVENTION

The demand for higher performance, microcontroller-based products for use in communication and processing applications continues to increase rapidly. As a result, microcontroller-based product manufacturers are requiring the components and devices within these products to be continually improved to meet the design requirements of a myriad of emerging audio, video and imaging applications.

These microcontroller-based products use various types of processors, for example, general purpose microprocessors for controlling the logic of various digital devices, such as clock radios, microwave ovens, digital video recorders and the like, and special purpose microprocessors, such as math coprocessors for mathematical computations, or digital signal processors used in manipulating various types of information, including sound, imaging and video information.

The microcontroller typically includes a central processing unit (CPU) core for the processing functions, and a bus interface for communication with the various memory devices as well as external or other peripheral devices. For the storage of data and instructions, the microprocessor can include various types of memory. For example, the CPU for the microcontroller may include Random Access Memory (RAM) as well as Read-Only Memory (ROM), i.e., programmed memory. In addition, the microcontroller can also include flash memory which can be erased and reprogrammed in blocks instead of being programmed one byte at a time.

For the transmitting and receiving of data between various devices and components, microprocessors and other devices may utilize various types of serial interfaces. One such type of interface typically used is the serial peripheral interface (SPI). The microprocessors also generally utilize one or more buffers for the temporary storage of data, for example, to permit the microprocessors to manipulate the data before transferring the data through the SPI to another device. These buffers are configured with the SPI's to enable the processors to transmit and receive data to and from the buffers as needed in an application.

An embedded system is a specialized computer system that is part of a larger system or machine. Typically, an embedded system is housed on a single microprocessor board with the programs stored in either ROM or FLASH memory. Some embedded systems include an operating system, but many are so specialized that the entire logic can be implemented as a single program.

In embedded microcontroller systems, the peripheral devices can be accessed by the CPU via a bus interface using a bus architecture, for example, a tristate bus architecture. There are a number of disadvantages associated with the tristate bus architecture. For example, in a tristate bus architecture, when a peripheral device is not being accessed, the peripheral device will provide a high impedance output to the bus. This characteristic is not desirable for a design for test (DFT) product because the high impedance makes it difficult to test the disabled tristate buffers. Furthermore, the high impedance signal can cause errors in the values tested. In addition, if no peripheral device is driving the bus, the resulting floating node will cause high leakage current. Moreover, if more than one peripheral is driving the bus, a short circuit current can result. Additionally, the tristate buffer architecture can cause a slow down in the transfer of information.

One approach that attempts to reduce the inadequacies associated with tristate bus architectures includes the implementation of bus keepers attached to the bus. Bus keepers are configured such that until the bus is driven with a different logic value, the bus keeper forces the bus to retain its previous logic value. Although the bus keeper approach may solve the floating node problem, the disabled tristate buffers are still very difficult to test. In addition, the tristate buffers need to be strong enough to "snap" the bus keeper, i.e., if the voltage on the bus is driven beyond a voltage threshold, the drivers can overcome the bus keeper device and cause it to hold the new logic value. For example, the bus might hold "0" (logic low voltage) until a "1" (logic high voltage) is driven to the bus by a sufficiently strong driver. Because snapping the bus keeper requires powerful drivers in the peripheral devices, a larger chip area and high power consumption is also required by this solution.

With reference to FIG. 2, a typical prior art CPU—Bus Interface (Bus IF)-Peripheral configuration is described in more detail. CPU 102 communicates through Bus IF 204 to communicate with one or more peripheral devices such as a first peripheral device (P1) 201, and a second peripheral device (P2) 202, through an Nth peripheral device (PN) 209. Generally, the peripheral devices communicate with CPU 102, and not with each other, through Bus IF 204. However, direct memory access (DMA) techniques also allow peripheral devices to communicate with memory without communicating with the CPU.

Bus IF 204 includes a transmitter 210 and receiver 212 which are connected over a common bus 220 to individual transmitters and receivers in the connected peripheral devices. For example, first peripheral device P1 contains transmitter P1T 231 and receiver P1R 241; second peripheral device P2 contains transmitter P2T 232 and receiver P1R 242; and Nth peripheral device PN contains transmitter PNT 239 and receiver PNR 249. The peripheral devices could be any type of peripheral device. CPU 102 provides signals 250 to Bus IF 204 commanding Bus IF 204 and the peripherals to perform a "read" or "write" operation, and identifying the appropriate peripheral device with which CPU 102 is to communicate. The peripheral device is identified via address lines, not shown, which provide enabling/disabling signals to the peripheral devices to enable the correct peripheral device for communication with CPU 102.

The transmitter 210 in Bus IF 204 and the transmitters (e.g. 231, 232, 239) in the peripheral devices are tristate transmitters. When enabled, the transmitters drive a signal comprising 1's and 0's to the common bus 220. When disabled, the transmitters provide a high impedance, Z state to the common bus 220. Because the transmitters and receivers share a common bus, when one transmitter is "talking", the other transmitters must "remain silent." If two transmitters were to talk at the same time, the transmission would most likely be garbled because the transmitters may be attempting to simultaneously drive both high and low voltages onto the same bus.

This tristate bus architecture gives rise to several problems as discussed above. For example, this architecture results in high power consumption. CMOS devices use relatively low amounts of power while holding a "1" or "0"; however, relatively large amounts of power are consumed while switching a CMOS device, or when the CMOS device is exposed to a high impedance Z state. If no devices are driving common bus 220, another high Z state arises. If no peripheral device is driving or receiving, the resulting floating node can cause high leakage current. When high power consumption occurs, the constant current flow also shortens the life of the device.

Moreover, if more than one peripheral is driving the bus, an undesirable short circuit current can result. This occurs, for example, when one device drives a "1" and the other device drives a "0", causing a high current to run between the high voltage and low voltage. It is also undesirable to have two transmitters sending data at the same time because of the possibility of scrambling the signal that should have been sent. Some microprocessors, however, have small possible overlaps between one device turning on and another device turning off The small overlaps cause short circuits. These short circuits may be avoided by providing a short time period between the moment when a first transmitter turns off and when a second transmitter turns on. Unfortunately, this time period results in unnecessary delay, thus slowing down the processing speed of the microprocessor.

The inclusion of a time gap between the transmissions of two different transmitters also gives rise, again, to the floating node condition where no device is driving common bus 220, and thus causes the high impedance Z state. To combat this problem, bus keepers have been added to the microcontrollers. For example, bus keeper 260 is provided in communication with common bus 220. Bus keeper 260 holds the last value on bus 220 until a new value is driven on bus 220. A disadvantage accompanying bus keeper 260 is that the tristate drivers need to be strong enough to snap the bus keeper; and therefore stronger drivers are required, resulting in a larger chip area and higher power consumption.

Another disadvantage of the presence of a high Z state is that it is difficult to test the circuit. It should be clear that in order to fully test the communication functions between the peripherals and the CPU, the tristate buffers need to be tested in their disabled state as well as when transmitting ones and zeros. It is desirable during testing that when one transmitter is transmitting data, the other transmitters can and do stay disabled. However, when these transmitter devices are disabled, a resulting floating node arises (a high Z state), and it is difficult to test for that condition.

Accordingly, a need exists for an improved embedded system bus architecture that solves the above problems. In addition, a need exists for an improved embedded system bus architecture that also facilitates high test coverage without the high power requirements and large area requirements.

SUMMARY OF THE INVENTION

The method and device according to the present invention addresses many of the shortcomings of the prior art. In accordance with various aspects of the present invention, an improved embedded system bus architecture provides for high test coverage and requires low power during operation. In accordance with an exemplary embodiment, an embedded system bus architecture is configured without the use of a tristate bus architecture, and instead comprises the use of data selector logic to access the various peripheral devices. In addition, a pure full CMOS pullup/pulldown network can be utilized. Further, the data selector logic can comprise various configurations.

In accordance with one aspect of the present invention, during operation, the peripheral devices will output their content when accessed by the CPU, which places the correct address value on the bus, and will output a "0" when not being accessed. In accordance with another aspect of the present invention, the embedded system bus architecture is configured such that the output of the peripheral devices passes through the data selector logic before reaching the bus interface receiver of the microprocessor. As a result, the CPU can suitably read the content of the peripheral device that is being accessed.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The present invention may be described herein in terms of various functional components and various processing steps. It should be appreciated that such functional components may be realized by any number of hardware or structural components configured to perform the specified functions. For example, the present invention may employ various integrated components, e.g., buffers, voltage and current references, memory components and the like, comprised of various electrical devices, e.g., resistors, transistors, capacitors, diodes or other devices, whose values may be suitably configured for various intended purposes. In addition, the present invention may be practiced in any microcontroller-based application. Such general applications that may be appreciated by those skilled in the art in light of the present disclosure are not described in detail herein. However for purposes of illustration only, exemplary embodiments of the present invention will be described herein in connection with a microcontroller. Further, it should be noted that while various components may be suitably coupled or connected to other components within exemplary circuits, such connections and couplings can be realized by direct connection between components, or by connection through other components and devices located therebetween.

Figure 1:
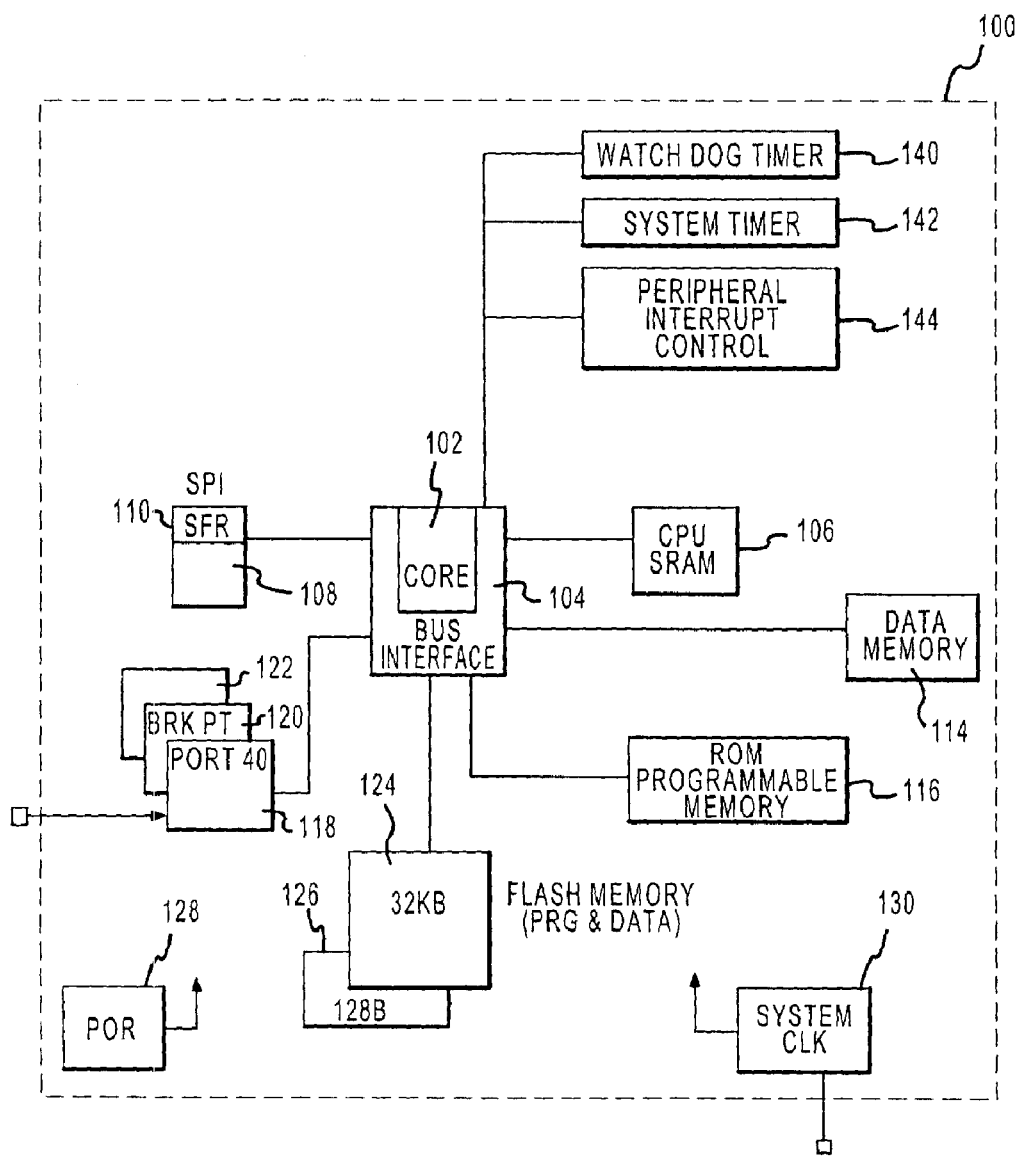
FIG. 1 illustrates a block diagram of an exemplary microcontroller in accordance with an exemplary embodiment of the present invention.

A microcontroller may include a large variety of components. Microcontroller components may include a Central Processing Unit ("CPU") in communication with memory devices, input/output devices, peripheral devices, and other typical microcontroller components. With reference to FIG. 1, an exemplary microcontroller 100 is illustrated. However, it should be noted that the exemplary embodiments of the present invention may be suitably implemented in any microcontroller configuration. Microcontroller 100 suitably comprises a central processing unit (CPU) core 102 configured for the processing of data, and a bus interface ("Bus IF") 104 for communication with the various memory or input and output devices. For the storage of data, microcontroller 100 can comprise various types of memory. For example, microcontroller 100 can comprise an internal CPU memory 106 which can be implemented using static random access memory (SRAM) and the like which can provide very low access time, e.g., as low as 10 nanoseconds. In addition, microcontroller 100 can include data memory 114 which can comprise, for example, SRAM-type memory. Microcontroller 100 can also include, for example, read-only memory (ROM) 116 which can comprise the non-reprogrammable memory for the Microcontroller 100. Still further, microcontroller 100 can also include flash memory for the programming and storage of data, such as a large page of memory 124 comprising, for example, 32 KB of data storage, as well as a smaller configuration of flash memory 126, comprising, for example, 128 Bytes. Microprocessor 100 can also comprise serial peripheral interface (SPI) 108 for transmitting and receiving data between various components. SPI 108 can communicate with the CPU memory 106 via direct memory access (DMA), i.e., SPI 108 can transfer data between memory components and a device without passing the data through the CPU. This data can be transferred through the bus interface 104 without being passed to the CPU.

Microcontroller 100 can also include input/output devices. For example, an I/O port device 118 can be provided, as well as a breakpoint device 120. Further, microcontroller 100 can also include a system clock 130 for providing clock cycles for triggering various functions and sequences during operation. Microcontroller 100 can also include a Power On Reset (POR) 128 for use during ramping up of a power supply.

Microcontroller 100 can also include peripheral devices. For example, peripheral devices might include watch dog timer 140, system timer 142, or peripheral interrupt controller 144. Other peripheral devices will be apparent, and the present invention is not limited to any particular type of peripheral device. In a microcontroller, the CPU communicates with memory and peripheral devices through a Bus IF 104. The CPU selects the memory location or the device with which the CPU wants to communicate, and either reads or writes data/instructions to or from that memory location or device via the Bus IF.

Figure 2:
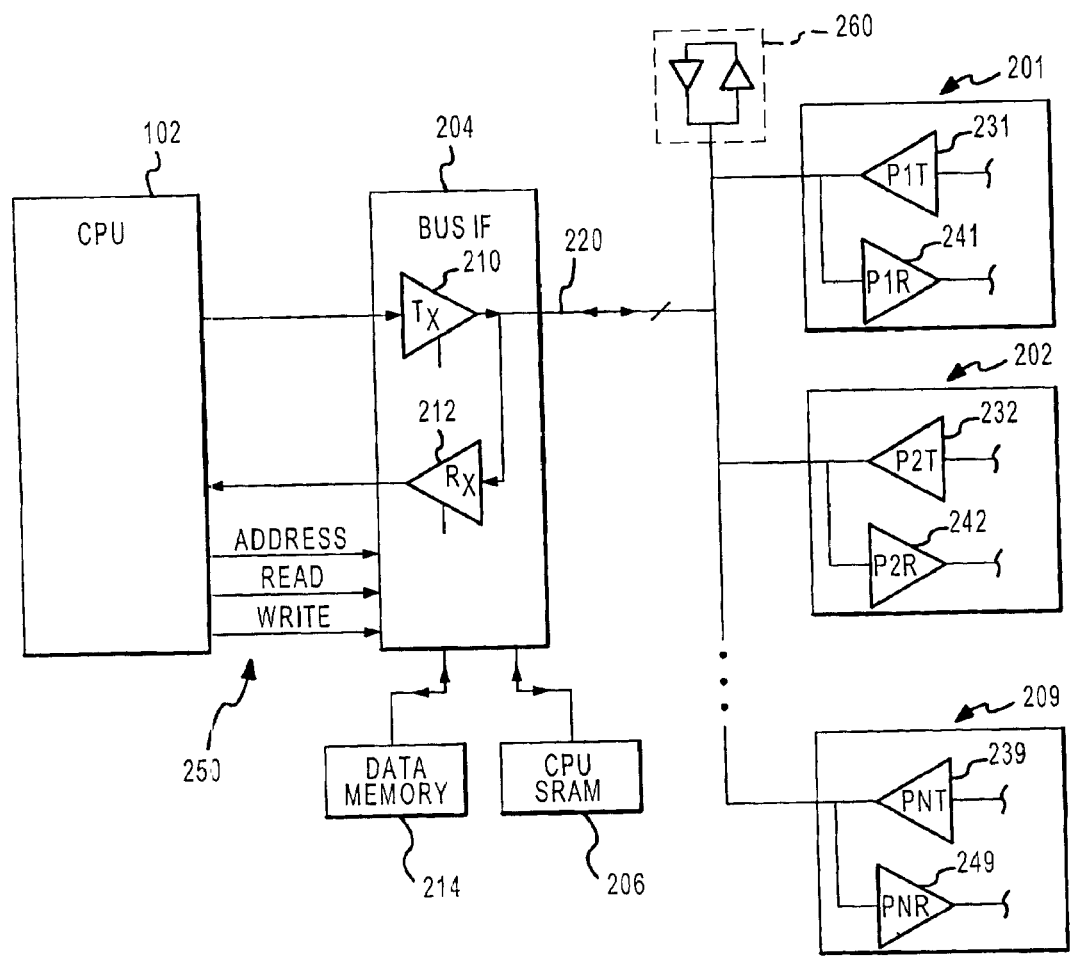
FIG. 2 illustrates a block diagram of a prior art CPU—bus interface—peripheral device configuration.

With reference again to FIG. 2, a typical prior art CPU—Bus IF—Peripheral configuration that includes tristate transmitters has several significant disadvantages, as discussed above. For example, the tristate architecture may result in high current leakage and high power consumption when a CMOS device is exposed to a high impedance Z state. This high impedance Z state exists when no devices are driving common bus 220. An undesirable short circuit condition may also exist if more than one peripheral device is driving the bus. The large current flow may shorten the life of the device. In some tristate architectures, undesirable time gaps may be created between a first and a second transmitter's use of Bus IF 204. These time gaps not only slow down the processing speed of the microcontroller, but give rise to the undesirable high impedance Z state. Some tristate architectures include bus keepers, the inclusion of which may undesirably increase the need for larger and more power consuming tristate transmitters. Another tristate architecture disadvantage is that it is difficult to test the tristate buffers in their disabled (high Z) state.

However, in accordance with various aspects of the present invention, an improved embedded system bus architecture is provided that can facilitate higher test coverage, require lower power during operation, and that does not require significantly more chip area. In accordance with an exemplary embodiment, an embedded system bus architecture is configured without the use of tristate bus architecture, and instead comprises split (or separate) buses and the use of data selector logic to access the various peripheral devices.

In accordance with an exemplary embodiment, a common bus for sending and receiving data is not used between the bus interface and the peripheral devices. Instead, a common bus can be used for sending data to the peripheral devices, and separate data buses can connect each peripheral transmitter to the bus interface. Data selector logic can then be used to pass transmissions from the peripheral devices through the bus interface to the CPU. Data selector logic can comprise various arrangements and devices, such as any logic or multiplexor configuration for performing the intended functions.

The peripheral devices may be configured to output their content when accessed by the CPU and will output a "0" when not being accessed. The embedded system bus architecture may be configured such that the output of the peripheral devices passes through the data selector logic before reaching the receiver at the bus interface of the microprocessor. The data selector logic may be located within the bus interface or independent of the bus interface. As a result, the microprocessor can suitably read the content of the peripheral device that is being accessed.

As discussed, the data selector logic can comprise various configurations. For example, because the peripheral devices may be selected one at a time by the microprocessor CPU, an exclusive selection logic may be used. In accordance with an exemplary embodiment, the data selector logic can comprise various configurations, e.g., an "OR" gate configuration in the bus interface, and an "AND" gate in a peripheral device, or any other logic configuration for performing the intended functions.

Figure 3:
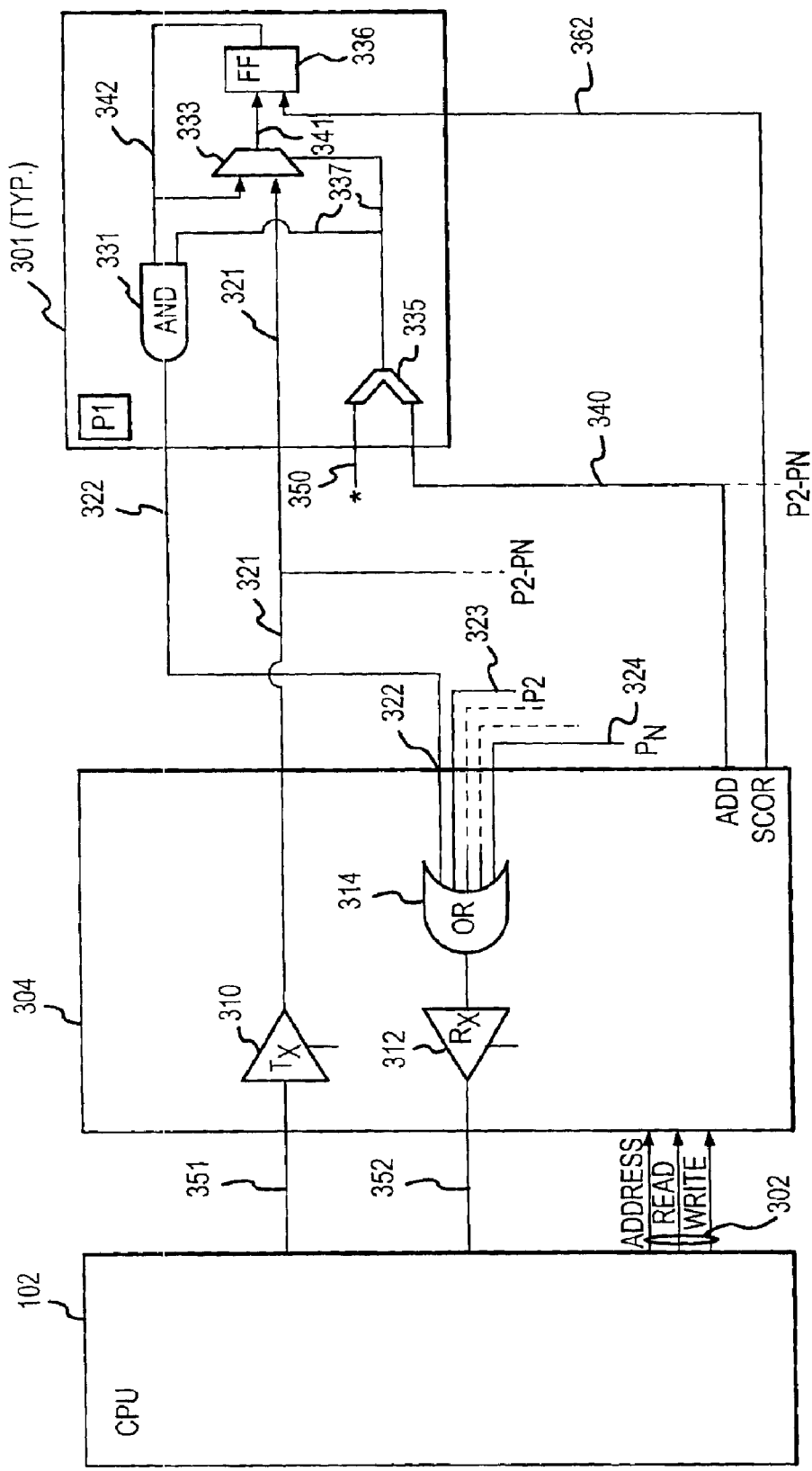
FIG. 3 illustrates a block diagram of a CPU—bus interface—peripheral device configuration in accordance with an exemplary embodiment of the present invention.

With reference to FIG. 3, a block diagram of an exemplary CPU—bus interface peripheral device configuration is illustrated. Bus IF 304 may be suitably connected in between a microprocessor CPU 102 and at least one exemplary peripheral interface device, e.g. P1, P2, to PN represented by reference number 301. In this embodiment, Bus IF 304 may include a receiving logic device such as an "OR" gate 314 and peripheral interface device 301 may include an "AND" gate 331. Bus IF 304 may also include a transmitter 310, and a receiver 312. In another exemplary embodiment, OR gate 314 may be provided external to Bus IF 304. Peripheral interface device P1 301 may also include a multiplexor 333 and a device for holding the current data value such as data flip flop 336. Furthermore, in an exemplary embodiment, peripheral interface device 301 may include a comparator 335. The AND gate 331, multiplexor 333, and comparator 335 are all examples of peripheral logic devices.

Transmitter 310 may be connected via a common bus 321 to a peripheral receiver (or multiplexor) 333, associated with one of peripheral devices P1–PN. AND gate 331 may communicate with OR gate 314. OR gate 314 may communicate with peripheral AND gates for each peripheral P1–PN via individual buses 322, 323, through 324. OR gate 314 may communicate with receiver 312 which may in turn communicate with CPU 102 via communication line 352.

In addition, in accordance with another exemplary embodiment, a pure full CMOS pullup/pulldown network can be implemented to replace the tristate drivers. Logic gates 331 and 314 may comprise these full CMOS pullup/pulldown devices. As a result, the pure full CMOS pullup/pulldown network provides minimum short circuit current, and avoids the floating signal line and conflict drive conditions of the prior art. In addition, a higher test coverage can be realized. The higher test coverage is possible because no high Z impedance states exist, i.e., only "0" and "1" states exist, and these states are easily tested. As a result, a 98% test coverage can be achieved.

Furthermore, even if two peripheral devices communicate at the same time, the conflicts can be resolved using error checking and data logic in a manner not possible when high Z states occur. Therefore, the reliability of the data is improved over that found in tristate driver systems. In addition, less power may be consumed, due to the absence of the short circuit causing high impedance Z states. Moreover, the above mentioned benefits may be achieved without increasing the chip area significantly. This is possible because the smaller transistors, and absence of a bus keeper offset the area needed for the additional logic devices. Also, the extra bus wires may be above the surface of the chip, so they do not require any further chip area.

The operation of an exemplary embodiment of the present invention may also be understood with reference to FIG. 3. For example, CPU 102 may provide address signals to Bus IF 304 via bus 302. These address signals may be provided by Bus IF 304 to each of the peripheral devices P1, P2 (not shown), . . . PN (not shown) (e.g. 301) via a common address bus 340. Peripheral interface device 301 may include a comparator 335 which may compare the value on address bus 340 with a pre-defined or hard-coded address 350 of P1. If comparator 335 determines that address signal 340 matches peripheral address 350, then the peripheral transmits the data that is stored on flip flop 336 and stores new data on flip flop 336. If a match does not exist, the peripheral transmits a "0" and holds the previous value on the flip flop 336.

In this exemplary embodiment, this control of the peripheral device is accomplished by using comparator 335 to provide a control signal 337 to multiplexor 333 and AND gate 331. Control signal 337 depends on whether the address signal 340 matches the peripheral address 350. If the addresses at comparator 335 match, control signal 337 causes multiplexor 333 to select the value on common bus 321 and place it on bus 341 which is the input to data Flip Flop 336. Thus, new data can be placed into data Flip Flop 336. Also, if the addresses match, control signal 337 causes the current value stored in data Flip Flop 336 to be passed on to P1 output bus 322 (for the case where P1 301 is the addressed peripheral) which in turn is communicated to OR gate 314.

If the addresses at comparator 335 do not match, control signal 337 causes multiplexor 333 to place the current data flip flop value (held on bus 342) on bus 341 (again, the input to data flip flop 336). Thus, the previous data can be placed back into data flip flop 336. Also, if the addresses do not match, control signal 337 causes AND gate 331 to provide a logic "0" to OR gate 314 via bus 322. Thus, OR gate 314 should receive a logic zero from all non-addressed peripherals and a data value from the addressed peripheral. This data signal can then be passed through OR gate 314 to receiver 312 for transmission to CPU 102.

As an example, if CPU 102 wants to send data to P1, it can provide to Bus IF 304 the P1 address and a write signal via signal lines 302 and the data via transmit signal line 351. Transmitter 310 may then send data down common bus 321 to peripherals P1–PN. The address signal may be provided to comparator 335 in each peripheral. Comparator 335 of the selected device (in this case P1) uses logic processing to provide an enable signal to multiplexor 333, while comparator 335 for the non-selected devices (in this case P2–PN) provides a disable signal to corresponding multiplexor's 333 for P2–PN. Thus, only the receiver in P1 is enabled and only the peripheral P1 receives the signal transmitted via common bus 321. The received data may be communicated to data flip flop 336 where the received data value may be stored for peripheral device P1 to access and use as appropriate.

If, on the other hand, CPU 102 wants to read data from P2, for example, it can provide to Bus IF 304 the P2 address, and optionally a read signal via signal lines 302. Note that for exemplary purposes, reference numbers used to indicate devices in P1 will be used for similar devices in P2. The address signal may also be provided to comparator 335 which uses logic processing to send an enable signal, e.g. "1", to the P2 AND gate 331 and a disable signal, e.g. "0", to all other AND gates (P1, and P3–PN). Data flip flop 336 then provides the data to AND gate 331. Because a "1" is provided to one pin of the AND gate, all data from flip flop 336 is passed through AND gate 331 to OR gate 314 via bus 323. Also, the AND gates 331 for all other peripherals (which are AND'ing with a "0") provide OR gate 314 a "0" via bus lines 322 and 324. OR gate 314 receives all these zeros from the disabled peripheral devices and passes through only the signal from P2. This signal is communicated to receiver 312 which, in turn, may communicate the signal to CPU 102 via lines 352 when CPU is ready to receive the data.

Various signal techniques can be used to signal the read/write, delay, and data signals. In an exemplary embodiment, the write signal is identified as "swr", read signal as "srd", address signal as "sa", data in sent to CPU as "blkname_sdi", and data out from CPU as "sdo". The bus configuration may be fully synchronous, or, in another embodiment, could be asynchronous. With reference again to FIG. 3, a "swr" write signal may be sent to flip flop 336 to indicate when that flip flop should transfer the value at its input to its output.

The CPU can be configured to perform all read and write accesses within one instruction cycle, as illustrated below. A CPU instruction cycle can be divided up into various components, with each component providing a specific task. For example, a CPU instruction cycle can be divided into four components C1, C2, C3, and C4. Alternatively more or less divisions of components can be used, and in some embodiments, instruction cycles may not be broken up at all. Each component may have certain tasks assigned to it such as, reading, writing, and other like tasks. Therefore, the CPU can read and write in the same instruction cycle. The outputs of all the "blkname_sdi" signals from various peripheral devices can suitably be connected to the "sdi" signal through an OR gate. When the CPU is reading a "blkname_sdi" signal, all other "blkname_sdi" signals from the peripheral devices that are not selected will suitably output "0". Thus the OR gate configuration can provide an "sdi" signal corresponding to the peripheral device that is selected.

Figure 4:
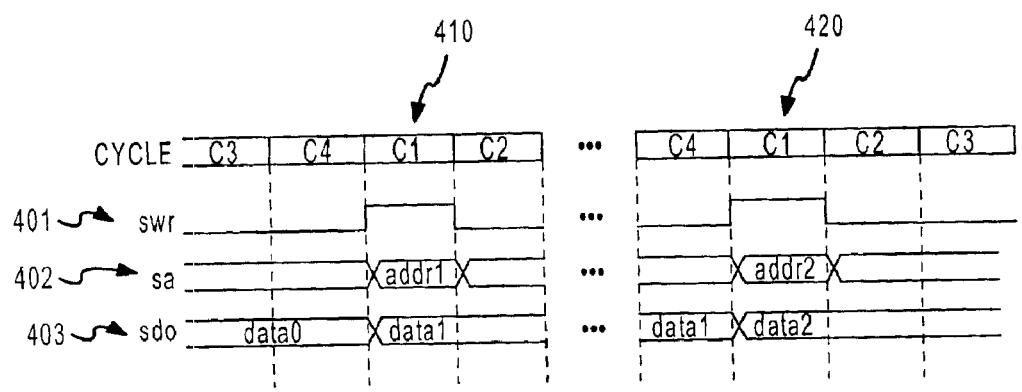
FIG. 4 illustrates a timing diagram of an exemplary write access operation in accordance with an exemplary embodiment of the present invention.

With reference to FIG. 4, an exemplary timing diagram of a write operation is illustrated. In accordance with an exemplary embodiment, a "swr" write signal 401 is provided by the CPU during a C1 clock phase 410. Also, during the C1 clock phase 410, the address and output data "sdo" signals, 402 and 403, are provided and may be suitably latched with the falling edge of the "swr" signal 401 at the end of the C1 clock cycle 410. The data on bus sdo 403 is stored in the data Flip Flops specified by sa 402. A second address and data are shown in a subsequent C1 cycle 420.

Figure 5:
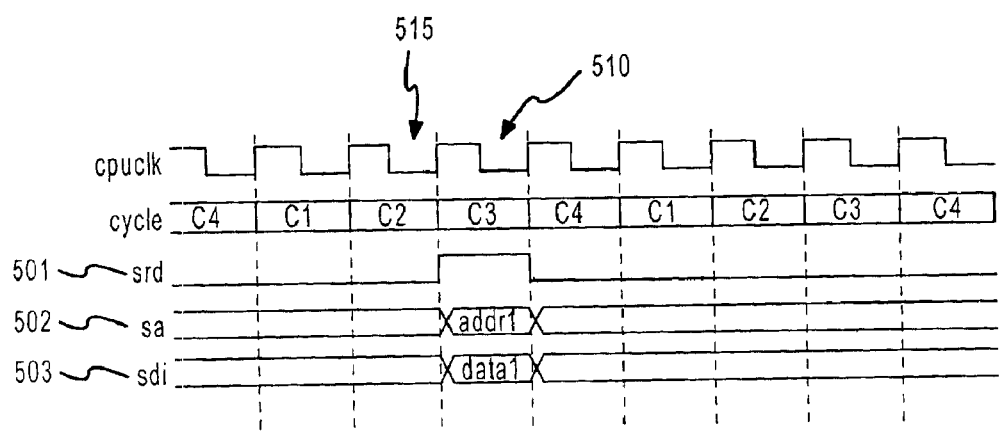
FIG. 5 illustrates a timing diagram of an exemplary read access operation in accordance with an exemplary embodiment of the present invention.

With reference to FIG. 5, an exemplary timing diagram of a read operation is illustrated. In accordance with an exemplary embodiment, a "srd" read signal 501 is provided by the CPU during a C3 clock phase 510. Also, during C3 clock phase 510, the address to be read signal 502 is provided and the data to be read, "sdi" signal 503, is received. The CPU reads the data on the "sdi" signal 503 at the end of the C3 clock cycle 510. During execution of instructions with indirect sources, for example, a MOV A, @RØ (move to the accumulator the contents of the SFR specified by RØ), and for other instructions, such as POP (contents of the stack is read), RET (return from subroutine), and RETI (return from interrupt), the "srd" signal is also active during the C2 clock cycle 515. In addition, the minimum number of cycles from "swr" signal 401 to the next "srd" signal 501 is 6 CPU clock cycles, e.g., from current instruction cycle C1 to the next instruction cycle C3.

Figure 6:
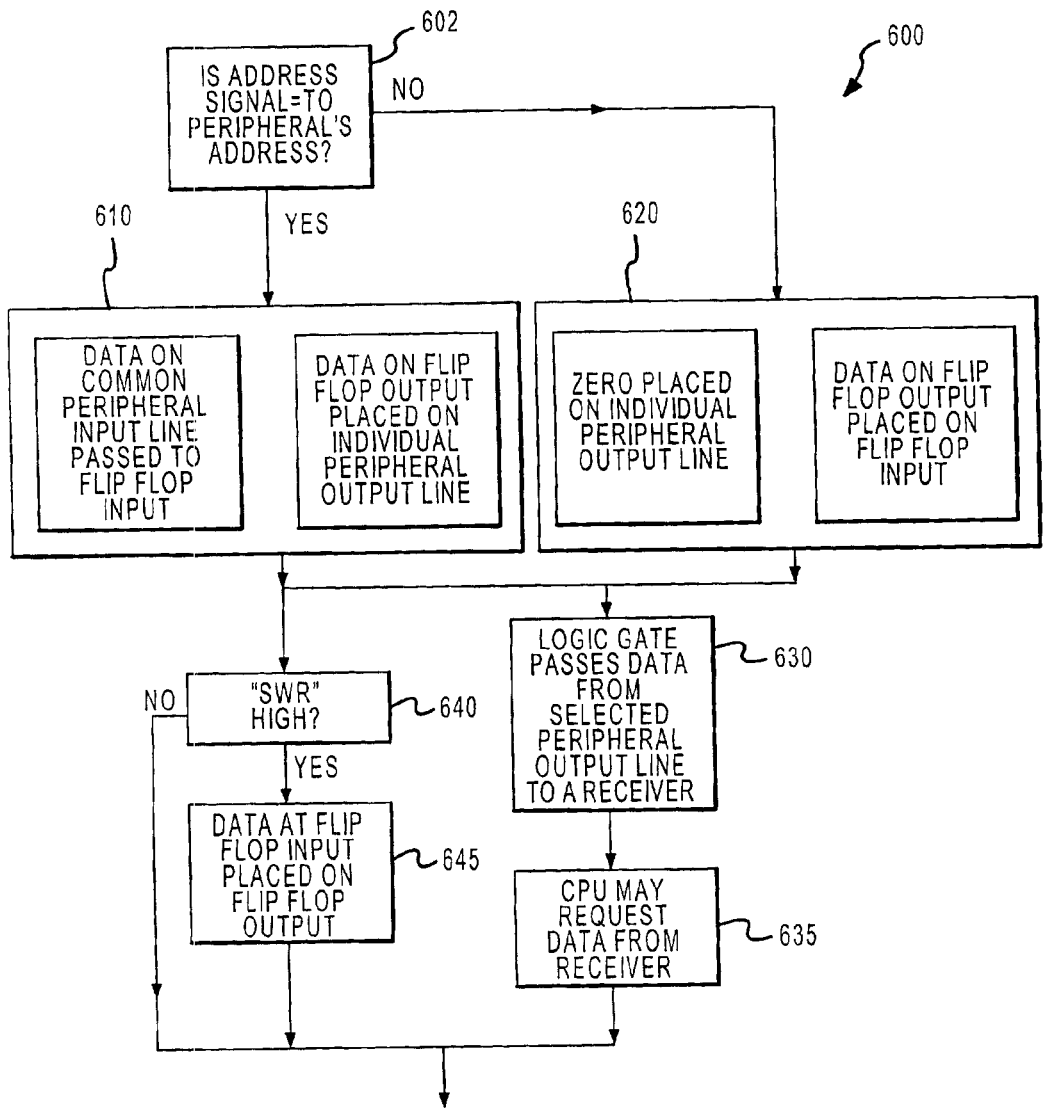
FIG. 6 illustrates an exemplary flow diagram of one method for reading and writing operation in accordance with an exemplary embodiment of the present invention.

The method of the present invention may be implemented in a number of ways, however, in accordance with an exemplary embodiment, and with reference to FIG. 6, a method 600 for reading and writing through the bus interface is illustrated. For example, in a step 602, a peripheral device checks to see if the address signal matches the peripheral device's assigned address. This comparison may be made, for example, via a comparator 335 where the peripheral device address is pre-programmed or hard coded into the device. Of course, other logic devices may also be used to make this comparison.

In this exemplary embodiment, if the peripheral's address matches the address on the common address bus, data on the common peripheral input line is passed to the flip flop input in a step 610. As discussed above, this may occur by sending a control signal 337 enabling a multiplexer 333 to pass data from common peripheral input line 321 to flip flop input 341. Furthermore, in step 610, when the peripheral is addressed, data on the flip flop output is placed on an individual peripheral output line. This step may be implemented through use of an AND gate 331 enabled by control signal 337 to pass data on flip flop output 342 to common bus 322.

On the other hand, if the address bus signal does not match the peripheral's address, a "0" or logic low may be placed on that peripheral's individual output line in a step 620. The "0" signal may be provided, for example, by an AND gate receiving a "0", although other logic devices may be used for this purpose. Furthermore, if in this exemplary embodiment, the address bus signal does not match the peripheral's address, data on flip flop output 342 may be placed on flip flop input 341 also in step 620. This data transfer may take place, for example, by use of a multiplexer 333 controlled via control signal 337.

Regardless of which peripheral device is addressed, a logic gate passes data from the selected peripheral output line to a receiver in a step 630. The passing of the selected peripheral output line data is accomplished in this exemplary embodiment by using an OR gate and by providing only logic zero on non-addressed peripheral devices. In step 635, the data passed to the receiver "sdi" may be received by the CPU 102 when the CPU is ready to receive it.

In addition, regardless of which peripheral device is addressed, in step 640 the peripheral device checks to see if a "swr" signal has been sent indicating that the CPU desires to write data to a peripheral device. If, for example, a logic high "swr" signal is sent indicating that the CPU desires to write data (available from the CPU "sdo" signal), data at the input for all flip flops is placed at the output of the respective flip flops in step 645. Although exemplary embodiments have been described with specific logic devices, it should be noted that various logic devices and combinations of logic devices as well as variations of the following steps may be used in this method.

The present invention has been described above with reference to an exemplary embodiment. However, those skilled in the art will recognize that changes and modifications may be made to the exemplary embodiment without departing from the scope of the present invention. For example, the various components may be implemented in alternate ways, such as varying or alternating the steps in different orders, and using different logic structures to achieve the same results. These alternatives can be suitably selected depending upon the particular application or in consideration of any number of factors associated with the operation of the system. In addition, the techniques described herein may be extended or modified for use with other types of devices, in addition to a microcontroller. For example, the invention may be implemented in a telecom switching matrix. In addition, it should be understood that the peripheral interface devices 301 can be incorporated into the architecture of the overall peripheral device, or can exist as a physically separate interface between the Bus IF and the peripheral device. These and other changes or modifications are intended to be included within the scope of the present invention.

What is claimed is:

1. A data communication device for communicating data with a peripheral device, the data communication device comprising:

a central processing unit;

a bus interface in communication with the central processing unit, the bus interface comprising a receiver;

at least one peripheral device;

a receiving logic device configured to communicate with the receiver and configured to pass data to the receiver from a selected peripheral device which is selected from one of the at least one peripheral device; and an individual bus coupled between the at least one peripheral device and the receiving logic device, wherein the receiving logic device is configured as an OR gate.

2. A data communication device according to claim 1, further comprising a logic device within the peripheral device for enabling and disabling receiving data.

3. A data communication device according to claim 2, the logic device further comprising at least one of an AND gate, a comparator, and a multiplexor.

4. A data communication device according to claim 3, wherein the AND gate is configured to be in communication with the OR gate.

5. A data communication device according to claim 3, wherein the comparator is configured to enable the AND gate upon receipt of an appropriate address signal.

6. A data communication device according to claim 3, wherein the comparator is configured to enable the multiplexor upon receipt of an appropriate address signal.

7. A data communication technique for use between a bus interface and at least one peripheral device, the data communication technique comprising the steps of:

identifying a peripheral device for communication; wherein an address identifies the peripheral device for communication;

receiving, at a receiving logic device, data signals from each of the peripheral devices;

transmitting to a receiver in the bus interface, through logic operations in the receiving logic device, only the data signal received from the identified peripheral device; and providing, to the receiving logic device, from all peripheral devices other than the identified peripheral device, a data signal that contains only logic zero; and wherein the receiving logic device is an OR gate.

8. A data communication technique in accordance with claim 7 further comprising the steps of:

enabling an AND gate in the identified peripheral device during a read operation; and disabling a receiving multiplexor in the identified peripheral device during a read operation.

9. A data communication technique in accordance with claim 7 further comprising the steps of:

disabling an AND gate in the identified peripheral during a write operation; and enabling a receiving multiplexor in the identified peripheral during a write operation.

10. A data communication technique in accordance with claim 7 further comprising the step of:

transmitting to a central processing unit, from the receiver in the bus interface, the signal from the identified peripheral device.

11. A data communication technique in accordance with claim 8 wherein the enabling and disabling steps during the read operation occur during a third instruction cycle.

12. A data communication technique in accordance with claim 9 wherein the enabling and disabling steps during the write operation occur during cycle a first instruction cycle.

13. A bus interface device for communicating with at least one peripheral device, the bus interface device comprising:

a transmitter in communication with a common bus configured to communicate with the at least one peripheral device;

a receiving logic device configured to receive a logic zero signal from each of the at least one peripheral device that is not selected, and configured to receive a data signal from one of the at least one peripheral device that is selected; wherein the signals are received via separate buses; and a receiver configured to receive the data signal from the receiving logic device, wherein the receiving logic device is an OR gate.

14. The bus interface device according to claim 13, wherein the bus interface device is connected to a peripheral logic device within the at least one peripheral device for controlling the sending of data to the peripheral and the receiving of data from the peripheral.

15. The bus interface device according to claim 14, the peripheral logic device further comprising at least one of an AND gate, a comparator, and a multiplexor.

16. The bus interface device according to claim 15, wherein the OR gate is configured to be in communication with the AND gate in each of the at least one peripheral device using an individual bus line.

17. The bus interface device according to claim 15, wherein the comparator is configured to enable the AND gate upon receipt of an appropriate address signal.

18. The bus interface device according to claim 15, wherein the comparator is configured to enable the multiplexor upon receipt of an appropriate address signal.

* * * * *